(12) United States Patent
Rahman

(10) Patent No.: US 10,438,064 B2
(45) Date of Patent: Oct. 8, 2019

(54) LIVE PICTURES IN MIXED REALITY

(71) Applicant: Microsoft Technology Licensing, LLC, Redmond, WA (US)

(72) Inventor: Fahrim Ur Rahman, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 4 days.

(21) Appl. No.: 15/860,522

(22) Filed: Jan. 2, 2018

(65) Prior Publication Data

US 2019/0206104 A1 Jul. 4, 2019

(51) Int. Cl.
*G06K 9/00* (2006.01)
*G06T 11/60* (2006.01)
*G06T 19/00* (2011.01)
*G06T 7/13* (2017.01)
*H04L 29/08* (2006.01)
*H04L 29/06* (2006.01)

(52) U.S. Cl.
CPC ..... *G06K 9/00671* (2013.01); *G06K 9/00221* (2013.01); *G06K 9/00228* (2013.01); *G06K 9/00288* (2013.01); *G06T 7/13* (2017.01); *G06T 11/60* (2013.01); *G06T 19/006* (2013.01); *H04L 67/141* (2013.01); *G06T 2207/10016* (2013.01); *G06T 2207/30201* (2013.01); *H04L 67/42* (2013.01)

(58) Field of Classification Search
None
See application file for complete search history.

(56) References Cited

U.S. PATENT DOCUMENTS

| 7,227,976 | B1 | 6/2007 | Jung et al. |
| 8,332,424 | B2 | 12/2012 | Flynn et al. |
| 8,814,691 | B2 | 8/2014 | Haddick et al. |
| 8,902,323 | B2 | 12/2014 | Zhang |
| 2006/0002607 | A1* | 1/2006 | Boncyk .................. G06Q 20/10 382/165 |
| 2009/0003662 | A1 | 1/2009 | Joseph et al. |

(Continued)

FOREIGN PATENT DOCUMENTS

WO 2016114930 A2 7/2016

OTHER PUBLICATIONS

Dantone, Matthias, et al. "Augmented faces." 2011 IEEE International Conference on Computer Vision Workshops (ICCV Workshops). IEEE, 2011.*

*Primary Examiner* — Zhengxi Liu

(57) ABSTRACT

A picture of a person's face is present in a mixed reality system. The mixed reality system has a monitoring or updating process that attempts to detect the presence of faces in the mixed reality. When a picture of a face is detected, the system detects edges of a picture frame or physical borders of the picture. If the picture is bounded by edges or is otherwise in a suitable physical form, then a canvas object is generated. The canvas object is arranged in the mixed reality to coincide with the picture of the face. A face recognition algorithm is used to find an identity of the face. Information updates specific to the identity of the face are obtained, applied to the canvas, and the canvas is rendered in the mixed reality. A viewer of the mixed reality will observe the information updates replacing or overlaying the picture.

20 Claims, 11 Drawing Sheets

(56) References Cited

U.S. PATENT DOCUMENTS

| | | | |
|---|---|---|---|
| 2010/0053410 A1* | 3/2010 | Yoshii | G06K 9/3216 |
| | | | 348/333.11 |
| 2011/0164792 A1* | 7/2011 | Yoon | G06K 9/00214 |
| | | | 382/118 |
| 2014/0331264 A1* | 11/2014 | Schneiderman | H04N 21/278 |
| | | | 725/92 |
| 2015/0206349 A1 | 7/2015 | Rosenthal et al. | |
| 2016/0328601 A1 | 11/2016 | Ming et al. | |
| 2017/0043252 A1 | 2/2017 | Kalaboukis et al. | |

* cited by examiner

IDENTITY/CREDENTIAL TABLE 224

| IDENTITY | INFO SOURCE | CREDENTIAL |
|---|---|---|
| mary@aol.com | URL1 | credential1 |
| mary.ortiz | (hostname, port) | credential2 |
| qin123@abc.edu | SocialNetworkZ | credential3 |
| ian-mcdoug | SMS@425-444-5151 | credential4 |
| GoTerps@espn.com | URL2 | credential5 |
| ian.mcdougal@linkedin.com | LinkedIn | credential6 |
| ... | ... | ... |

FACE TABLE 220

| GLOBAL ID | DISPLAY NAME | EXTERNAL IDENTITIES | CANVASES |
|---|---|---|---|
| 1 | Mary Ortiz | mary@aol.com, mary.ortiz | A, C |
| 2 | Qin Chen | qin123@abc.edu | B |
| 3 | Ian McDougal | ian-mcdoug, GoTerps@espn.com, ian.mcdougal | C, D |
| ... | ... | ... | ... |

CANVAS TABLE 222

| ID | LOCATION | DIMENSIONS | ORIENTATION |
|---|---|---|---|
| A | anchor1 | 100, 100 | 123 |
| B | (123, 143, 29) | 550, 400 | 90 |
| C | buildingX, roomY, (x,y,z) | 600, 200 | 270 |
| D | (direction, distance) | 400, 600 | 144 |
| ... | ... | ... | ... |

FIG. 7

LIVE PICTURES IN MIXED REALITY

BACKGROUND

As virtual and augmented reality (collectively, "mixed reality" hereafter) see greater everyday use, new opportunities for providing context-relevant information are arising. As people move about the physical world while experiencing an augmented reality presentation, the physical objects and scenes around them are potentially personally relevant. Similarly, navigation through a virtual reality space may expose a user to representations of real world objects. While annotating mixed reality objects with information has been known and practiced, such information augmentation has failed to appreciate opportunities for information augmentation with respect to persons.

Consider that a mixed reality may contain physical or digital photos of persons. As only the inventor has appreciated, as those photos are exposed to or approached by a user, there is a potential personal connection between the subjects in the photos and the user. That possible personal connection between the subjects in photos and the user might serve as the basis for augmenting the user's mixed reality experience with information about (or created by) the subjects in the photos. Moreover, information reflecting the personal connection between a subject in a photo and the user can be incorporated into a mixed reality presentation in a way that is consistent with, and even enhances, the personal connection between the user and the subject. Techniques related to annotating photos in mixed reality are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

A picture of a person's face is present in a mixed reality system. The mixed reality system has a monitoring or updating process that attempts to detect the presence of faces in the mixed reality. When a picture of a face is detected, the system may detect edges of a picture frame or physical borders of the picture. If the picture is bounded by edges or is otherwise in a suitable physical form, then a canvas object is generated. The canvas object is arranged in the mixed reality to coincide with the picture of the face. A face recognition algorithm is used to find an identity of the face. Information updates specific to the identity of the face are obtained, applied to the canvas, and the canvas is rendered in the mixed reality. A viewer of the mixed reality will observe the information updates replacing or overlaying the picture.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 7 shows information that may be managed by the information augmentation system to put information from information sources into the right places in the mixed reality.

DETAILED DESCRIPTION

Figure 1:
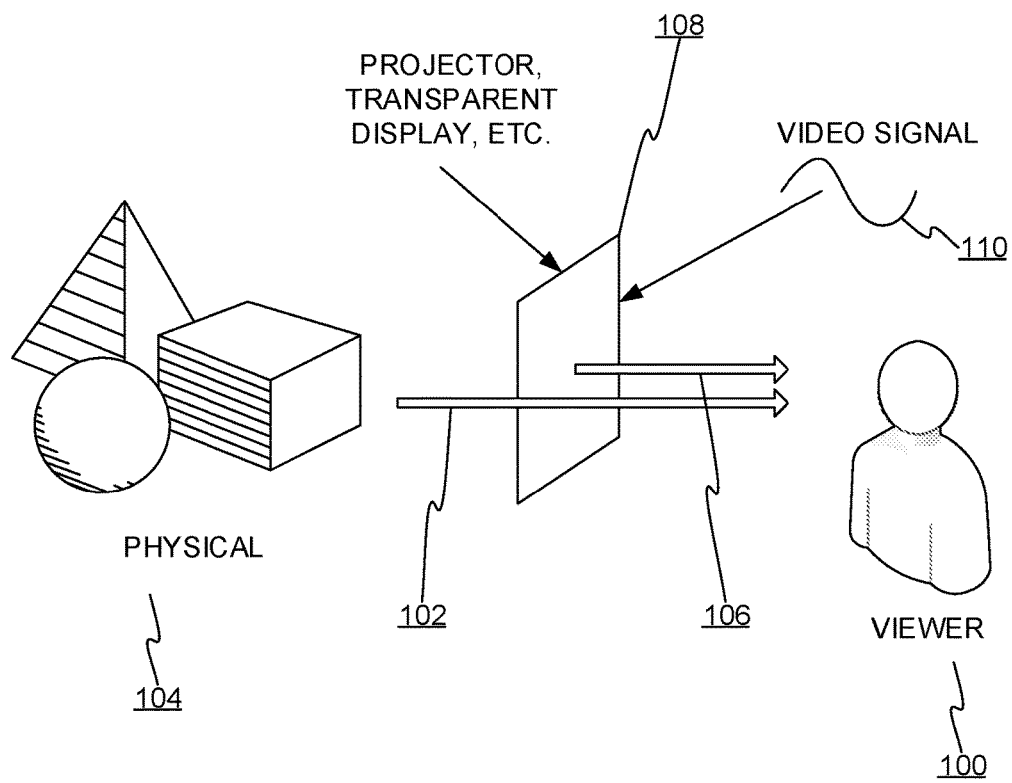
FIG. 1 shows a mixed reality presentation where the eyes of a viewer or user receive a mixture of (i) real world light reflected from a physical space and (ii) computer rendered light.
Figure 2:
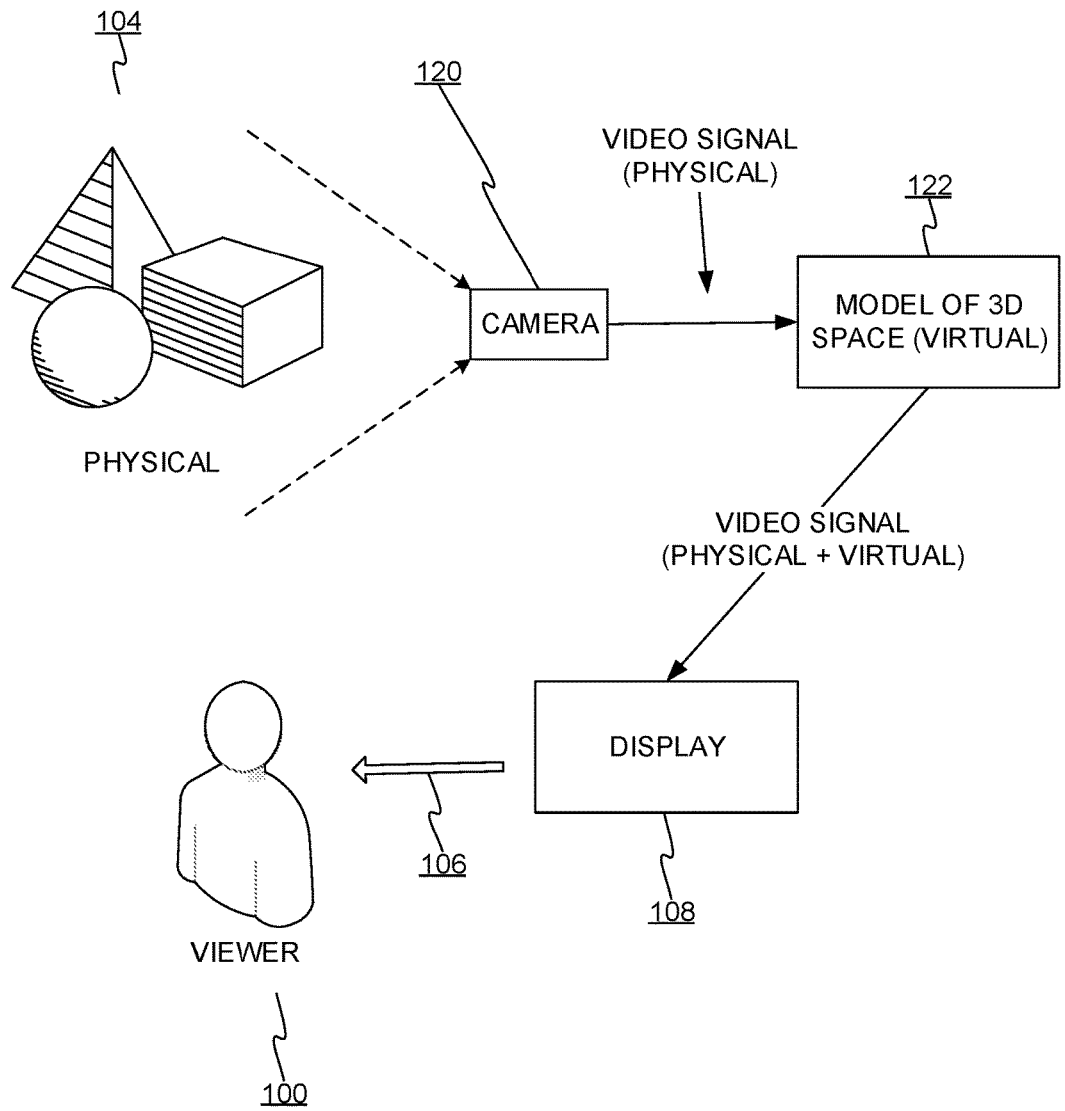
FIG. 2 shows a mixed reality configuration where the eyes of the user receive primarily computer rendered light.
Figure 3:
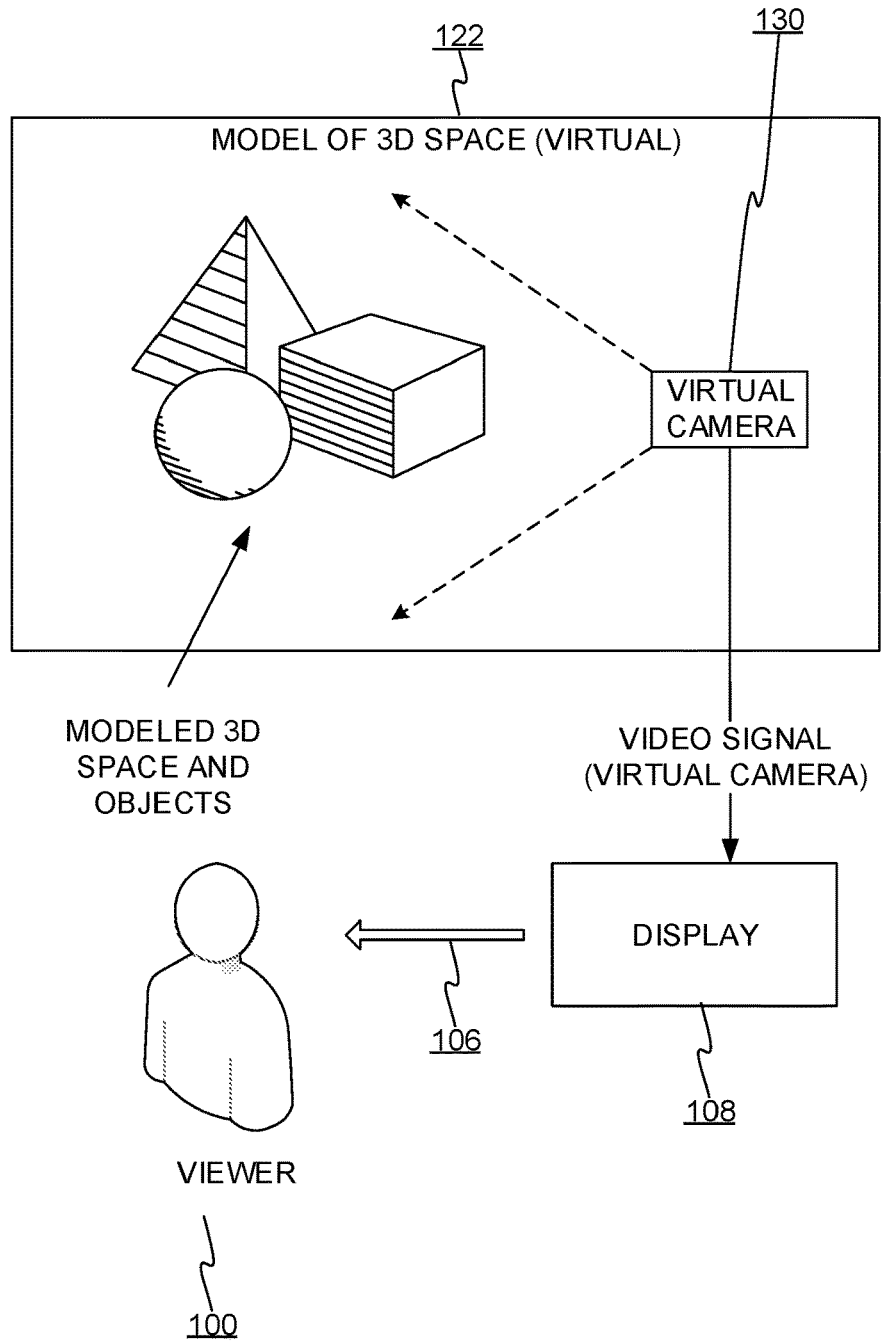
FIG. 3 shows a virtual reality (VR) variant of a mixed reality system.

FIGS. 1-3 show types of mixed realities to which embodiments described herein may be applied. As noted in the Background, the term "mixed reality" as used herein refers to virtual reality and various types of augmented reality.

FIG. 1 shows a mixed reality presentation where the eyes of a viewer or user 100 receive a mixture of (i) real-world light 102 reflected from a physical space 104 and (ii) computer rendered light 106. That is, the user perceives the mixed reality as a composition of computer-generated light and real-world light. The real-world light 102 is light from an ambient source (artificial or natural light) that has reflected from the physical space 104 and passes as such to the eyes of the user 100; the real-world light is not computer rendered light, and may pass to the eye directly, by reflection, and/or by transmission through transparent or optically transformative material. In contrast, the computer rendered light 106 is emitted by any video display device 108 that converts a video signal 110 generated by a computer into light formed to an image that corresponds to the content of the video signal 110.

The display device 108 may be any type of such signal-to-light converting device. In the type of hybrid physical-virtual reality shown in FIG. 1, the display device 108 may any type of device that allows the real-world light 102 and the computer rendered light 106 (generated by the display device 108) to both fall on the eyes of the user 100 at the same time, thus forming a composite physical-virtual image on the retinas of the user 100. The display device 108 might be a transparent or semi-transparent device ("transparent" as used hereafter will also refer to "semi-transparent") that can both generate the computer rendered light 106 and allow the real-world light 102 to pass through it (often referred to as a "heads-up" display). The display device 108 in the case of FIG. 1 might be a small video projector mounted on goggles or glasses that projects its image onto transparent lenses of the goggles or glasses (a head mounted heads-up display). The display device 108 may be a projector that projects onto a large transparent surface (a fixed heads-up display). The display device 108 may be a small projector that projects directly onto the user's retina without the user of a reflective surface. The display device 108 may be a transparent volumetric display or three-dimensional (3D) projection. Any type of device that can render a video signal 110 into visible light and can also permit composition of such light with physical world light will be suitable for the type of mixed reality shown in FIG. 1.

FIG. 2 shows a mixed reality configuration where the eyes of the user 100 perceive the mixed reality as primarily computer rendered light 106. The computer rendered light 106 comprises rendered video whose frames include (i) real world image data of the physical space 104 as captured by a camera 120, and (ii) virtual image data generated by a computer. The virtual image data is generated and rendered by a computer, for example from a model of a 3D space 122, a two-dimensional (2D) model (e.g. a windowing desktop), or other virtual space under the interactive control of the user 102. In this type of mixed reality, the user 102 sees a full computer-rendered image, but the image seen by the view includes both artificially generated graphic data as well as image data provided by the camera 120. Note that the video signal from camera 120 may be either a pre-recorded signal or a real-time signal. The mixed reality is presented by the display device 108, which may be a flat-panel display, a touch-sensitive display surface, a projector, a volumetric display, a head-mounted display (e.g., virtual reality (VR) goggles), or any other technology used to produce full-frame renderings of video produced by a computing device.

FIG. 3 shows a VR variant of a mixed reality system. This type of mixed reality is primarily computer-derived. As with FIG. 2, a model of a 3D space 122 is provided. The user 102 manipulates a point of view or virtual camera 130, and a VR engine renders the view in the 3D space as "seen" by the virtual camera 130. The VR engine generates graphics that the computer translates into a video signal that the display device 108 then displays. The display device 108 may be any type of display discussed above. Aside from information augmentation and related techniques described herein, basic 3D modeling, rendering, and displaying are conventional and description thereof is readily found elsewhere. The VR variant may be considered a form of mixed reality in that artifacts within the modeled 3D space may include image data captured of physical objects or scenery. For example, previously captured videos or digital images of physical persons may be incorporated into the model of the 3D space 122. The real-world image data may be modeled as independent objects (e.g., rectangles, ovals, etc.) such as 2D digital photos three-dimensionally arranged and oriented within the model of the 3D space 122. The real-world image data may also be incorporated as textures of 3D objects or surfaces modeled in the 3D space (e.g., texture-mapped to a 3D model of a display, picture frame, wall, etc.).

Figure 4:
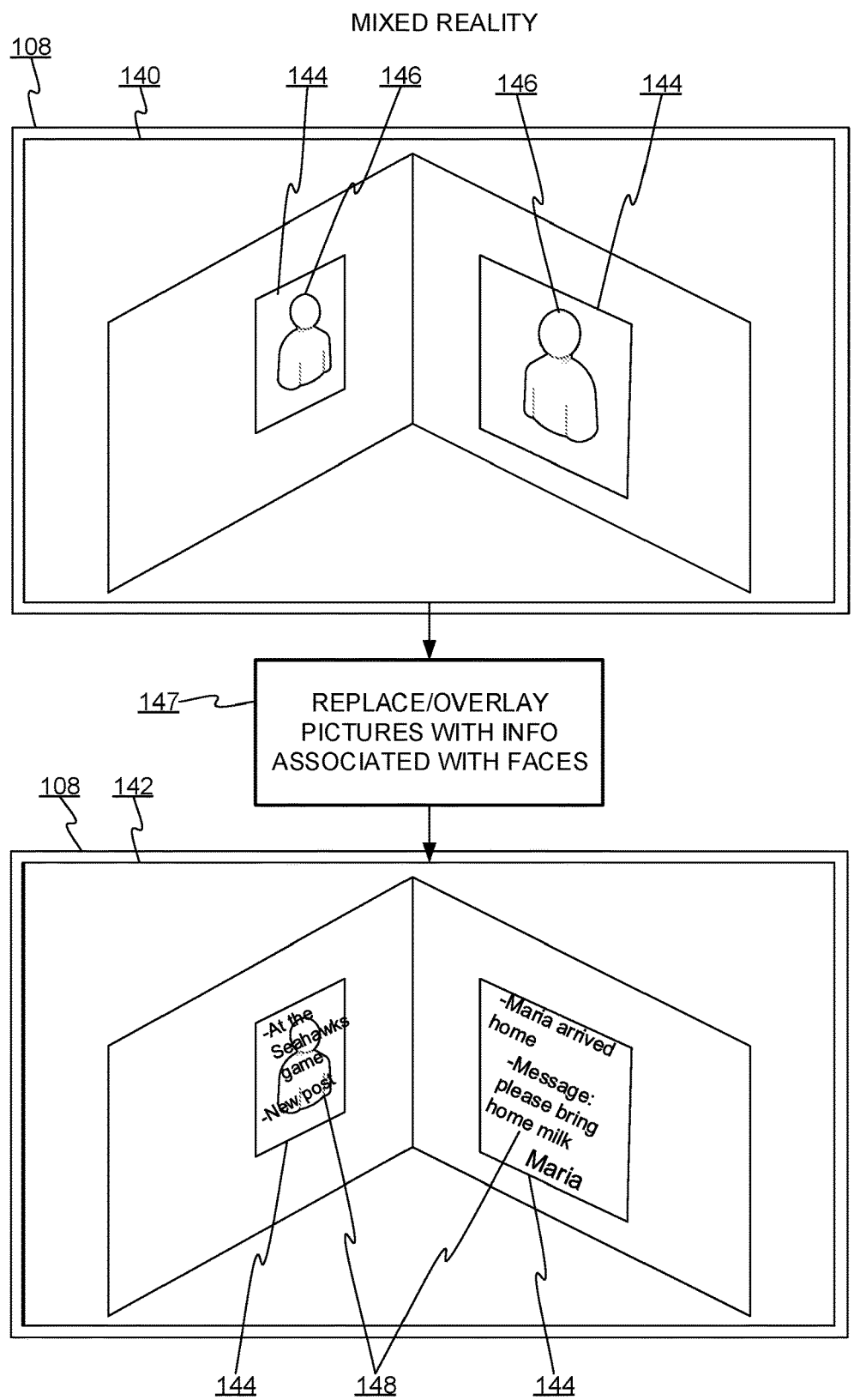
FIG. 4 shows renderings of a mixed reality space before and after being augmented or annotated with external information.

FIG. 4 shows renderings 140, 142 of a mixed reality space before and after being augmented or annotated with external information. The renderings 140, 142 are displayed by the display device 108 in any of the mixed reality configurations described above. The state/video data of the mixed reality includes digital or hardcopy images 144 of persons 146 previously captured by a camera and then placed, in digital or physical form, in a physical or virtual space of the mixed reality. One or more computers perform a process 147 of analyzing the mixed reality model/signals to replace or overlay the images 144 with information specifically obtained based on identifying the persons 146 represented in the images 144. As shown in rendering 142, the images 144 are overlaid by, or replaced by, information updates 148 about (or authored by) the respective persons 146. Details of the process 147 are described below. The renderings 142, 144 of the mixed reality may be presented by any of the types of mixed reality described with reference to FIGS. 1-3, however, the process 147 injects information associated with the persons 146 into the output seen by the user.

Figure 5:
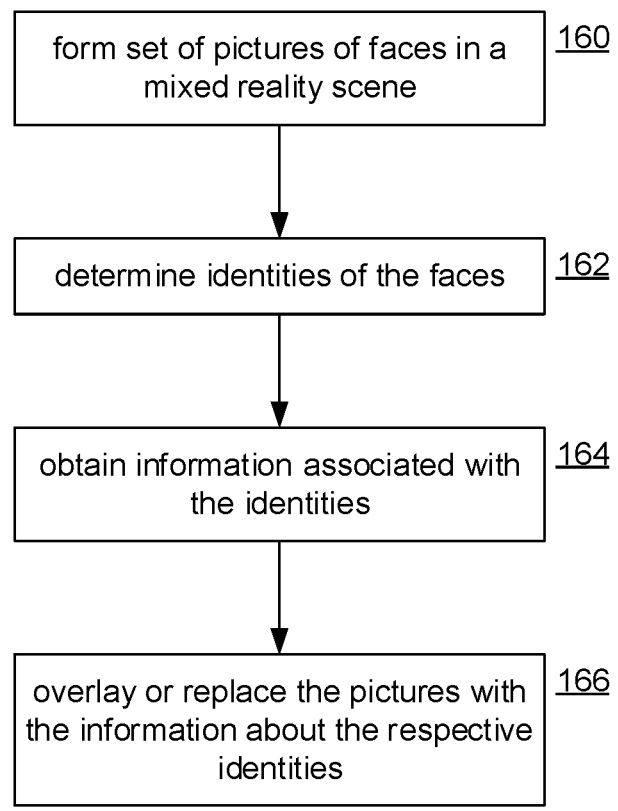
FIG. 5 shows an algorithmic overview of an image replacement/overlay process.

FIG. 5 shows an algorithmic overview of the image replacement/overlay process 147. At step 160, a set of pictures of faces in a mixed reality scene is identified. If the mixed reality is embodied as in FIG. 1 (e.g., heads-up display), then a camera signal capturing the physical scene 104 is analyzed to detect faces and model their locations and orientations. If the mixed reality is constructed in the manner of FIG. 2 (displaying a blend of captured video and system-generated graphics), then either the video signal of camera 120 is analyzed or the video signal of the composited camera and virtual graphics is analyzed to detect faces. If the mixed reality is a virtual reality embodiment as discussed with reference to FIG. 3, then step 160 may involve nothing more than searching objects in the 3D virtual space, for instance using an object index perhaps paired down to search only objects in the view of the virtual camera (user point of view). Any of the many known face-detection algorithms may be used to detect faces in the video or image data that is expected to potentially contain faces. In the case of analyzing video data, the face detection may include heuristics to filter out faces of physical persons captured by the camera. For instance, if video data of a physical scene is being analyzed, the face detection algorithm may be modified to detect only flat stationary faces by ignoring faces with depth or motion (the face itself or the face relative to the scene). Color histograms and other techniques may also be used for differentiation.

At step 162, face recognition is performed on each of the faces detected in step 160 to determine identities of the detected faces. Known face recognition algorithms may be used. At step 164 the identities of the respective faces are used to obtain information associated with the identities (persons). Step 164 involves configuring the system to communicate with information sources that recognize or manage the identities and which store and provide the information associated with the identities. The information sources may be social networks, instant messaging services, message posting services, local notification services (e.g., operating system services), remote notification services (e.g., Really Simple Syndication (RSS) feeds), and the like. Any identity-based form of communication, whether broadcast or person-to-person, may be used, so long as individuals can be identified, and content associated with a given individual can be selectively obtained. Either push or pull mechanisms may be used to communicate with the information sources.

Finally, at step 166, the obtained information associated with the identities is inserted into the mixed reality so that the user can see what information is associated with which face/identity. This step may involve modifying the representation, video signal, or model of the mixed reality to overlay or replace each identified picture with the corresponding picture-specific information obtained from a local or remote information source. In one embodiment, a user interface (UI) canvas or surface is instantiated and mapped to the corresponding picture. Programmatically, the canvas is just another UI element for displaying data, and an opaque image of the UI element replaces the picture or a semi-transparent image of the UI overlays the picture. If the picture is texture mapped to a 3D object or surface, the UI element's image can be similarly texture mapped. The details of adding graphics to the mixed reality will depend on how the mixed reality is implemented. For instance, some systems allow programmatic insertion of UI elements into mixed reality representations. As discussed further below, in one embodiment edges bounding the picture, for instance a frame within which a picture is mounted, or the bare edges of a hardcopy or poster (or digital picture frame), are detected during the image analysis and such boundary of the picture anchors the insertion of face-specific information.

Figure 6:
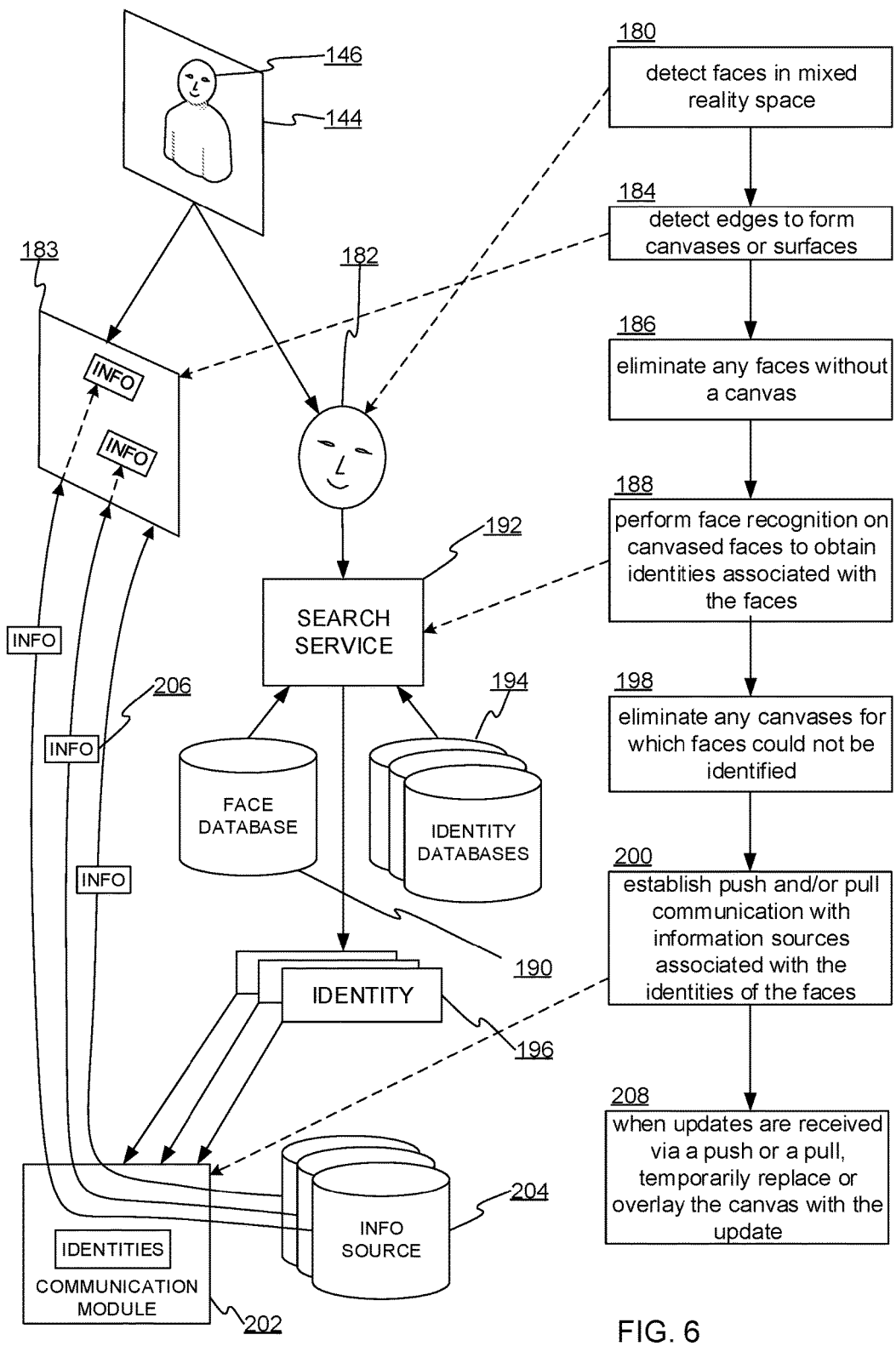
FIG. 6 shows an embodiment for augmenting pictures in a mixed reality presentation with information associated with the faces in the pictures.

FIG. 6 shows an embodiment for augmenting pictures in a mixed reality presentation with information associated with the faces in the pictures. The embodiment of FIG. 6 does not require any prior information about the mixed reality, i.e., the embodiment can be used in any physical or virtual scene where the user has not previously used the picture augmentation system. In mixed reality cases where real-time video of the user's surroundings is being captured and possible incorporated into the mixed reality, at step 180 the captured video is analyzed to detect faces in the captured video. The video may be being captured by a head-mounted camera, a stationary local camera, a handheld device with a built-in camera, etc. In a virtual reality case, objects in the virtual reality may be scanned to detect faces. As noted above, the face detection algorithm may include logic to find only images of faces and to avoid actual human faces.

In the case of a virtual reality system, the 3D models are searched. If an index of images is available, candidate images can be scanned for face detection. The set of candidates to be scanned can be scoped according to factors such as the user's current view and/or position, whether the user changes the view suddenly and frequently, the geometry of the space being navigated, etc. In the case of mixed reality systems that scan video captured from a camera capturing the physical view of the user, the video signal is scanned to detect faces. Scanning may be combined with any 3D reconstruction of the physical scenery to avoid re-scanning the same physical surfaces or to initiate scanning of newly exposed physical surfaces or objects.

In any case, the output of step 180 is a set of faces 182 and respective links to their placement in the mixed reality space. Scanning may also include detecting edges that bound the images containing detected faces. At step 184 an edge detection algorithm is used to detect edges associated with the faces 182. In one embodiment, a face 182 is only considered to be a candidate for further processing for information augmentation if the face has a closed edge boundary (e.g., a closed polygon or a closed circle, oval etc.). A step may be needed to test for whether an image boundary is coplanar with the image data containing the face. For some VR objects, edge scanning may not be necessary, for instance, when a face image is mapped to a bounded surface or object.

When edge detection is complete, canvases 183 may be created (or recorded, if such objects already exist) to serve as targets for later display of face-related information. If multiple faces are detected in a same picture bounded by a same boundary, then artificial bounding boxes may be constructed to bound each face, and those boxes may then serve as information canvases 183. In another embodiment, a canvas 183 may be defined for the entire multi-face image and the information related to the faces/identities is intermixed within the canvas. A canvas 183 may be implemented as any type of object that coincides with a corresponding face; a bounded plane, a face of an object such as a wall, a surface (e.g., a Non-uniform rational basis spline surface), etc. Canvases 183 that are newly generated objects that are added to the mixed reality may need to be mapped to the geometry of the mixed reality space to coincide with their respective faces in the mixed reality space, thus, when face-related information is to be displayed, the canvas 183 can be used to overlay or replace the corresponding face image in renderings of the mixed reality space containing the face image. Such orienting/positioning may depend on the point of view of a viewer, for instance when changes in the user's point of view create parallax effects.

At step 186, any detected faces that did not have a detected boundary are eliminated from further processing; a canvas is not provided and the picture of the face is not augmented with related information. After step 186, the data for further processing includes the set of detected faces 182 associated with their respective canvases in the mixed reality space. The ordering of steps 180, 184, and 186 can vary.

At step 188, face recognition is performed on the remaining canvased faces. Face recognition can be performed with known algorithms that compare an image of a target face with images in a database of faces 190. Alternatively, the database may contain features extracted from face images, and the features are compared to features of the target face. The face recognition search may be performed by a local or network search service 192. The face search might be performed by an API or service of a social network or a search engine. In one embodiment, the face recognition search is performed locally by comparing the detected face image to faces in a local contacts database. In another embodiment, the search service 192 is a federation module that translates a face search request into searches for multiple face search systems (local and/or remote), and then collates the results and presents them to the image information augmentation system. The search service 192 maintains associations between faces and identities in one or more identity databases 194. That is, the search service 192 may associate external identities with faces. A single face 182 may have multiple identities found to be associated therewith. To summarize, at step 188 face recognition is applied to the set of candidate faces to find identities associated therewith, and the search service 192 outputs the one or more identities 196, which in turn are associated with the faces and canvases.

At step 198, any canvases that have faces that could not be identified are eliminated. If a canvas contains an identified face and an unidentifiable face, the unidentifiable face is dropped from the canvas. In one embodiment, a UI element may be presented to enable interactive identification or disambiguation of potential identities of a face.

At step 200, a communication module 202 of the system is configured with the identities 196 and means to communicate with information sources 204 according to the identities 196. An information source can be any local or remote source of information about persons. Instagram (™), Facebook (™), LinkedIn (™), are typical external information sources that can be tapped into through various APIs, local client software, RSS feeds, SMS messages, system notifications, or any source of information that can be associated with a user identity. Moreover, the information sources 204 may report either information posted by the identified persons themselves or information about the persons that is provided by third parties (e.g., news bulletins).

The communication module 202 may serve as both a communication and information-formatting interface between the information sources 204 and the part of the system that provides the information 206 to be graphically incorporated into the mixed reality system. The communication intermediation may be push or pull based, according to the capabilities of the information sources 204. The information 206 may be formatted according to the type of graphic environment being used. Markup formatting, raw text, text fields of UI controls, or the like may be used for rendering the information 206.

FIG. 7 shows information that may be managed by the information augmentation system to put information 206 from the information sources 204 into the right places in the mixed reality. A face table 220 stores records corresponding to respective persons whose faces have been identified. Each record in the face table 220 serves as a global identity that represents a single person. Each record may be associated with multiple photos of the same represented person. The face table 220 may have columns such as a display name to be displayed in canvases, the identities 196 associated with the person, and a list of canvases. That is, each record stores a list of identities associated with the represented person and a list of canvases where the represented person appears.

The list of canvases in a face table 220 entry includes pointers to the individual canvases in a canvas table 222 where the represented person is present. The canvas table 222 maintains data for each canvas in respective entries. The form of the canvas table 222 will vary according to details of the mixed reality, available programming constructs, etc. In one embodiment, the canvas table 222 provides all of the geometric data needed to paint each canvas in the mixed reality; location or coordinates, size, orientation, etc. In another embodiment, the canvas table 222 may be a list of pointers to objects, UI controls, anchor points in the mixed reality, or the like that are managed by the mixed reality. The objects may have properties or methods for providing text or multimedia from the information sources 204 to the canvases. The content is then rendered when the object is rendered in the mixed reality.

The identities in the face table may be linked to detail entries in an identity table 224. The identity table 224 is provided to facilitate communication with the information sources 204. In one embodiment, the identity table 224 includes credentials (or pointers to credentials stored elsewhere) to enable the communication module 202 to communicate with the information sources. At the least, the identity table 224 entry includes a user account, user name, login id, or similar identifier that identifies the relevant person to the corresponding information source 204, thus allowing information specific to that person to be acquired and incorporated into the mixed reality.

Figure 8:
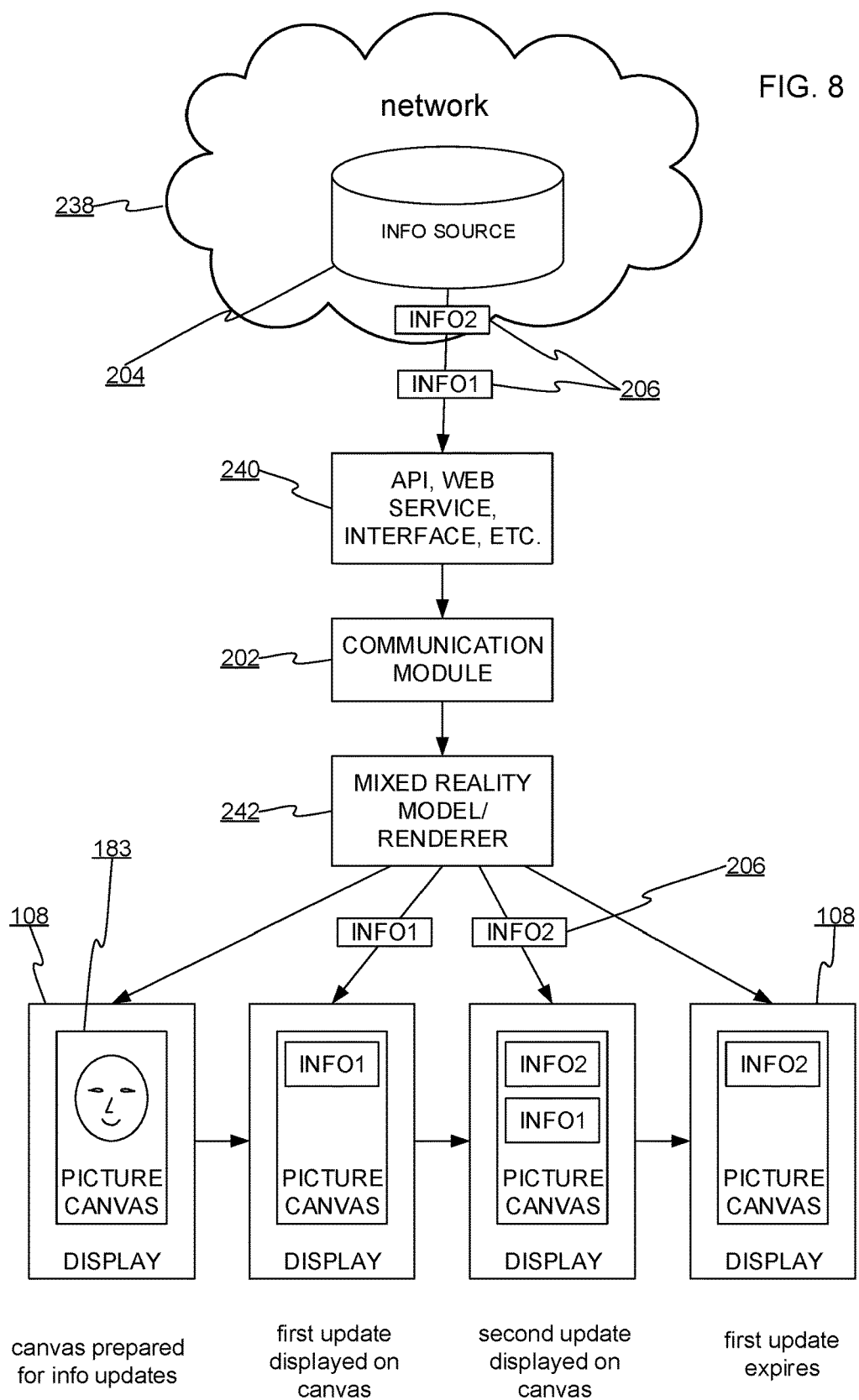
FIG. 8 shows a progression of the display, on a canvas, of information associated with a face on the canvas.

FIG. 8 shows a progression of the display, on a canvas 183, of information 206 associated with a face on the canvas. Initially, at the lower left of FIG. 8, the canvas 183 is available and the system is configured to receive information 206 about the relevant person (subject). A first piece of information 206 ("info1") is pushed over a network 238 from an information source 204, through a software interface 240, and to the communication module 202. The communication module 202 determines which identity, among its list of canvased identities, the incoming "info1" corresponds to. The communication module 202 consults the face table 220 to find which canvases 183 (in this example, only one) have been determined to contain a picture of the subject of "info1". The communication module 202 may either update all of the canvases, or it may update only a canvas currently in view of the user.

A mixed reality model/renderer 242 receives the information and renders it to the display 108. As shown in the canvas second from the left in FIG. 2, "info1" is displayed in the canvas (in this example, replacing the picture of the person, although an overlay may be used). In one embodiment, the information provided to a canvas is only kept for a certain amount of time, and is then discarded. In another embodiment, the canvas has a limited-size queue that stores the pieces of information in the order they are received. When the queue is full, older pieces of information are removed from the queue when new pieces of information are added. In this case, the canvas may either be displayed temporarily, or it may be permanently displayed (preferably as a semi-transparent overlay). When another piece of information 206 is received ("info2"), whether pulled or pushed, the same process is performed to display the information in the mixed reality, as shown in the third display 108 from the left in FIG. 8. If displayed information has a lifetime, then "info1" may be removed from the canvas before "info2", as shown on the rightmost display 108. In yet another embodiment, a canvas is only displayed for a limited time each time an information is added to it. For instance, if an information item is received, its canvas may be displayed for only one minute, and the time may be reset if a new item is received.

Figure 9:
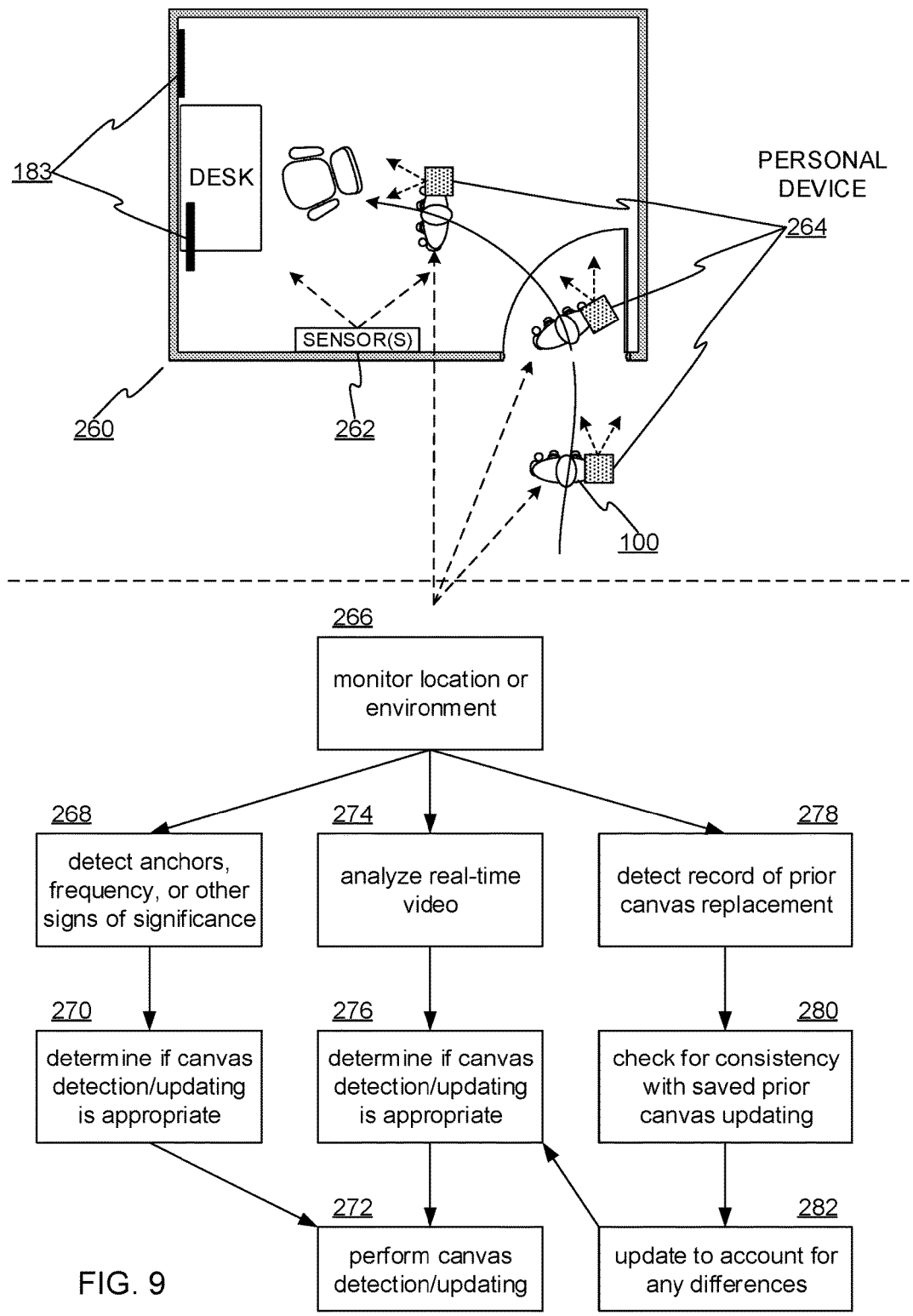
FIG. 9 shows how movement of the user can be monitored to populate pictures/canvases with information as the user enters an area such as a room.

FIG. 9 shows how movement of the user 100 can be monitored to populate pictures/canvases with information as the user 100 enters an area such as a room 260. One or more sensors 262 are fixed and/or on a personal device 264 of the user 100. The sensors may be cameras, depth sensors, radar, etc. One or more computers (perhaps the personal device 264) perform a step 266 of monitoring the location or the movement of the user 100. In one embodiment, at step 268, data is collected for the user's location and passed to step 270. At step 270, a heuristic is applied to the location data to help decide whether to perform information augmentation. Mixed reality anchors may be present to indicate that the area is of significance to the user (e.g., an "office" anchor). A visitation history might indicate that the area has been visited frequently or for long durations. If the area is found to be sufficiently connected to the user 100, then step 272 is performed and canvases are detected/updated as described above.

If live video is being captured, then at step 274 the video is analyzed to extract features relevant to potential canvas detection. For example, amount of movement of the user 100, lighting conditions, geometry of the location (are vertical surfaces present), preliminary indications of faces present (e.g., skin tones in color histograms), etc. At step 276, these factors are evaluated to determine if canvas detection/updating is appropriate.

In another embodiment, the monitoring may include, at step 278, checking for the presence of canvases that have already been constructed. If it is determined that a canvas already exists in the area, then at step 280 the location is checked for consistency with the canvas. If live video is being used, then the presence and location of the image corresponding to the canvas is searched for. At step 282, and discrepancies between the previously saved canvas and the location are accounted for. If the picture of the person corresponding to the canvas has moved, then the canvas may be updated accordingly. If the picture has been removed from the location, then the canvas is removed.

To summarize, when the user 100 enters a new location, new pictures of faces may be scanned for. The scanning may be constrained to certain conditions. If canvases already exist in that area, they may be verified and perhaps updated or removed according to the current state of the location. Any canvases that are available, whether previously or newly created, are then displayed in the mixed reality with prior or new information specific to the person(s) in the picture(s) in the user's location.

Figure 10:
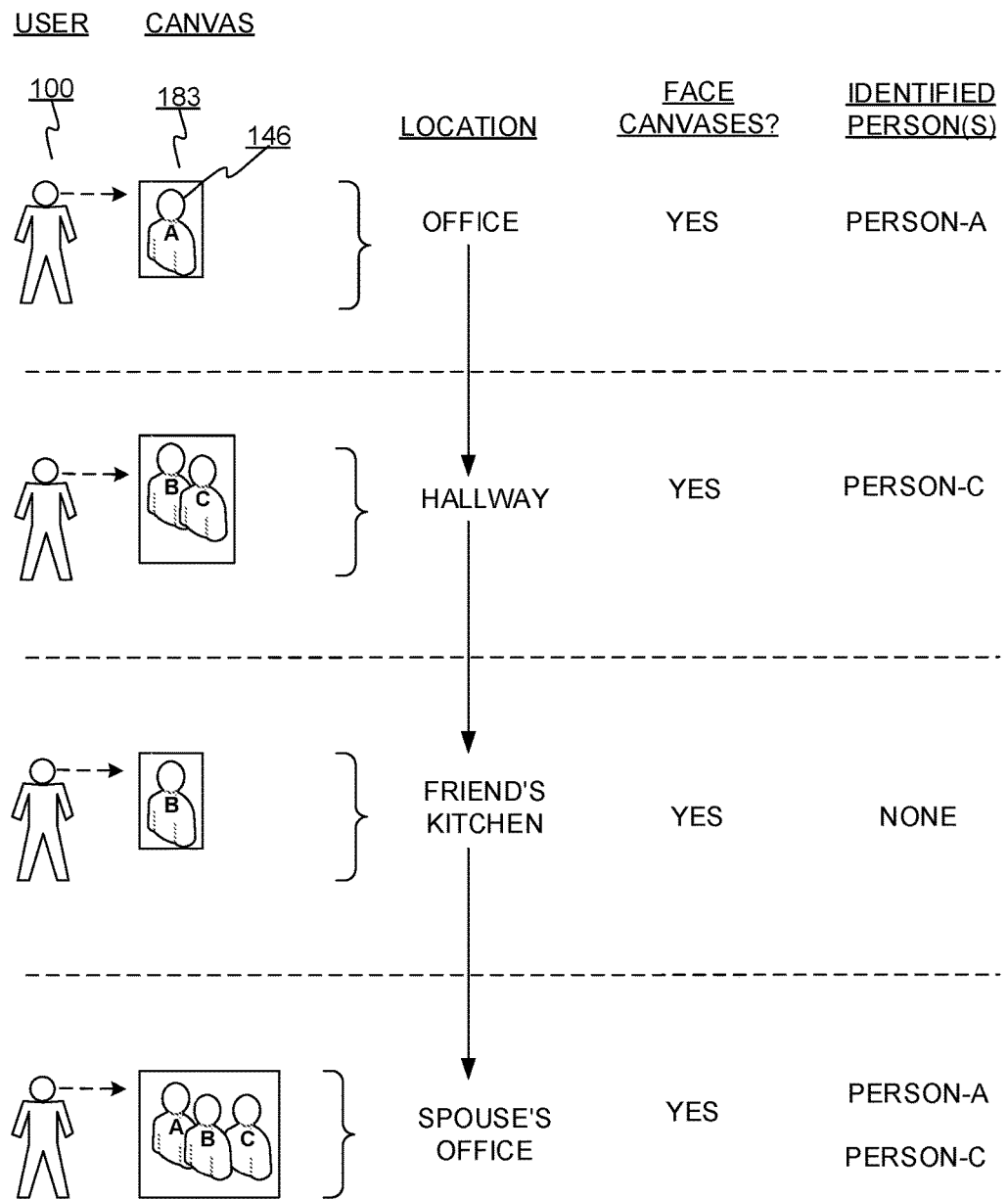
FIG. 10 shows an example of identities and canvases that might come into play as the user moves from one location to the next.

FIG. 10 shows an example of the identities and canvases that might come into play as the user 100 moves from one location to the next. Initially, the user 100 is in an office location. The system determines that a canvas exists in that area or a face and identity are found and a new canvas is formed. When in the office, a hardcopy image 144 of person "A" is on the wall, and a corresponding canvas 183 that is graphically keyed to a frame of the hardcopy image is displayed in a rendering of the mixed reality. When the user 100 moves to a new location—a hallway—a picture is again detected (either by video analysis, model searching, or other techniques discussed above). In this case, to faces are detected in the picture. However, only the face of person "C" is identified. Consequently, a canvas is configured to display information updates about person "C", which the user 100 will observe while looking toward the picture in the hallway. Later, the user 100 moves to a kitchen. A picture of a face of person "B" is detected in a bordered area, however the face cannot be identified, and no information is added to the mixed reality. When the user 100 moves toward a spouse's office, heuristics discussed with reference to FIG. 9 may inhibit attempting to detect faces or display canvases with annotations from information sources. When walking down the street face scanning might be disabled due to the transient nature of the locus. A previously generated picture/canvas might be encountered but the continued movement of the user 100 inhibits acting on the picture/canvas. When the user 100 arrives at the spouse's office, the system might detect the existence of a previously created canvas in the area, confirm that the corresponding picture is still present, perhaps re-aligning the canvas with the picture if the picture has been moved, then displays information about persons "A" and "C" who have been identified in the picture.

In one embodiment, the system may obtain information from the information sources independent of where the user is or what canvases are being displayed. The global list of user identities and information sources are used to continually push/pull information about the canvased persons. The information is cached in association with the corresponding identities. Any time a canvas for an identity is rendered, the cache is consulted to obtain the relevant information for presentation in the mixed reality.

Although embodiments for searching for still images in a mixed reality have been described above, other types of physical face portrayals may be scanned for, identified, and augmented with information. For example, in the case of a digital picture frame (or a computer display serving the same purpose), the digital picture frame might be displaying a short video loop portrait of a person. The same techniques above may be used, but using video face recognition and identification. Heuristics such as minimal face movement or minimal direction deviation can be used to operate only on videos that are analogous to still portraits. In addition, statues of faces may be detected, identified, and enhanced with identity-based information. Furthermore, although techniques have been described herein as being applicable to video data, it will be appreciated that the same techniques can be used for captures of single still images. Moreover, face detection/recognition need not perform temporal analysis. Analysis of individual video frames may suffice for identifying faces, edges of canvases, etc. Where the terms "video", "video stream", "video data" and the like are used herein, such terms also refer to still images and analyses of single video frames.

Figure 11:
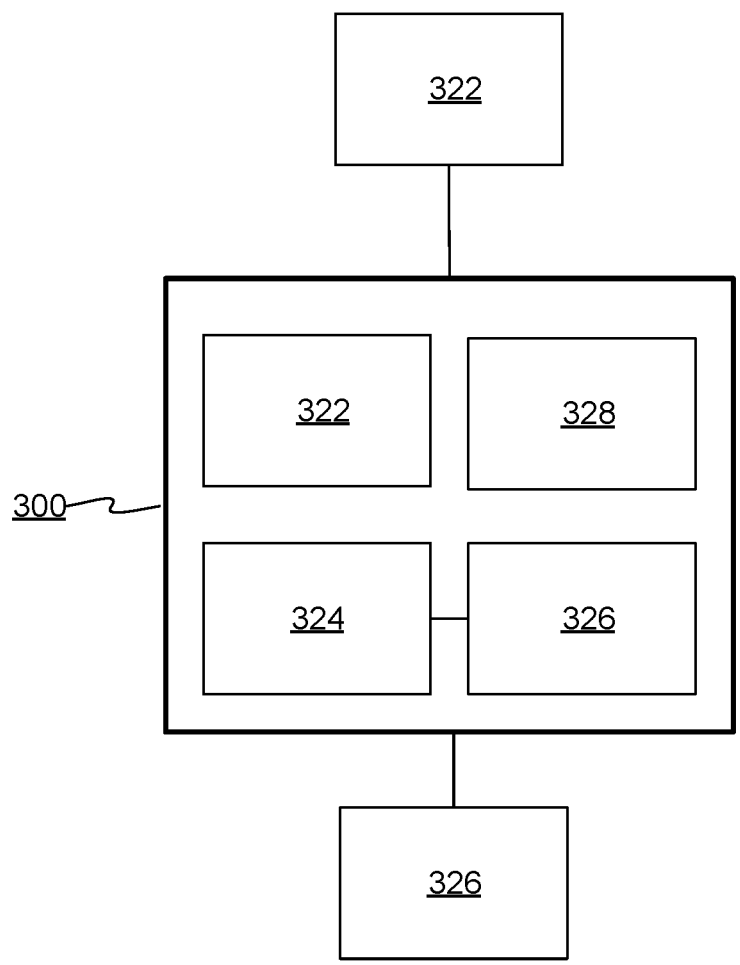
FIG. 11 shows details of a computing device on which embodiments described herein may be implemented.

FIG. 11 shows details of a computing device 300 on which embodiments described above may be implemented. The computing device 300 is an example of a client/personal device or backend physical (or virtual) server devices that may perform various (or perhaps most) of the processes described herein. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 300 (possibly via cloud APIs) to implement the embodiments described herein.

The computing device 300 may have one or more displays 322, a camera (not shown), a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 300 may cooperate in ways well understood in the art of machine computing. In addition, input devices may be integrated with or in communication with the computing device 300. The computing device 102 may have any form-factor or may be used in any type of encompassing device. The computing device 102 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 328. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by one or more computers comprising processing hardware and storage hardware, the method comprising:
    generating renderings of a mixed reality scene, wherein the renderings of the mixed reality scene are computed according to video of a physical scene corresponding to the mixed reality scene, the physical scene including a two-dimensional physical picture of a face;
    scanning the video of the physical scene to detect the two-dimensional physical picture of the face within the mixed reality scene, wherein the two-dimensional picture of the face is detected in the video by logic that differentiates between two-dimensional physical pictures of faces and three-dimensional physical faces;

based on the detecting of the two-dimensional physical picture of the face, performing face recognition to determine an identity of the detected face;

according to the identity, establishing a communication channel with an information source to obtain information updates associated with the identity of the face; and incorporating the information updates into the renderings of the mixed reality scene.

2. A method according to claim 1, wherein the physical picture comprises a hardcopy image comprising the two-dimensional face.

3. A method according to claim 2, further comprising detecting, in the video, edges of the hardcopy image, and wherein the incorporating the information updates into the renderings of the mixed reality scene is based on the edges.

4. A method according to claim 2, wherein the mixed reality scene comprises a virtual reality comprising a 3D space comprised of 3D models, the 3D space comprising an image of the face, wherein the scanning comprises searching the 3D space for two-dimensional images.

5. A method according to claim 1, wherein the method is performed at least in part by a portable computing device that moves with a user viewing the renderings of the mixed reality scene, the portable computing device capturing the video of the mixed reality scene, the scanning performed on the video of the mixed reality scene.

6. A method according to claim 1, the method further comprising storing an association between the identity and the information source, and incorporating the updates based on the association.

7. A method according to claim 1, further comprising displaying the renderings of the mixed reality scene such that eyes of a user viewing the renderings receive a combination of light generated by a display device and light reflected from a physical scene, and wherein the information updates are displayed to replace or overlay the two-dimensional face within the mixed reality scene.

8. A computing device comprising:
processing hardware;
a display device; and
storage hardware storing information to enable the processing hardware to perform a process, the process comprising:
executing a detection algorithm that detects two-dimensional physical images of faces in video by differentiating between two-dimensional physical images of faces and three-dimensional physical faces, the differentiating performed by detecting features associated with two-dimensional physical images and by detecting features associated with three-dimensional physical faces, the detection algorithm detecting a two-dimensional image of a face of a person in a model of a virtual reality scene or in a video signal from a camera capturing a physical scene;
obtaining an identity of the person according to the image of the face;
receiving information updates from an information source, the information updates comprising content obtained based on being associated with the identity of the person; and
causing a display of the information updates to overlay or replace the image of the face in the model of the virtual reality or in the video signal.

9. A computing device according to claim 8, wherein the causing the display of the information updates to overlay or replace the image of the face comprises detecting edges bounding the image of the face and positioning the display of the information updates according to the edges.

10. A computing device according to claim 9, the process further comprising detecting a second image of a second face and determining that the second image of the second face is not bounded by edges.

11. A computing device according to claim 9, the process further comprising sizing and arranging a canvas object according to the edges, and arranging the information updates on the canvas object.

12. A computing device according to claim 11, the process further comprising storing an association between the canvas object and the identity of the person, obtaining second information updates from the information source according to the stored association and not based on detecting the image of the face, and displaying the second information updates on the canvas.

13. A computer-readable storage device storing information configured to cause a computing device to perform a process, the process comprising:
receiving a video stream comprising image data of a physical scene captured by a camera, the physical scene including a physical picture of a person;
searching for images of flat stationary faces in the image data to detect the picture of the person, the searching performed by logic that differentiates between stationary two-dimensional physical pictures of faces and three-dimensional physical faces;
based on detecting the picture of the person, performing face recognition on the video stream to recognize the person from the picture of the person in the video stream;
based on the recognizing of the person, obtaining information items associated with the person from an information source; and
arranging a rendering of the information items in correspondence with a determined arrangement of the picture of the person in the physical scene, wherein the rendering is either (i) displayed to be superimposed over the picture in the physical scene, (ii) incorporated into the video stream which is then displayed, or (iii) displayed on a transparent surface through which the physical scene is being viewed.

14. A computing device according to claim 13, wherein the identity comprises an account identifier managed by the information source.

15. A computing device according to claim 8, wherein the causing the display comprises displaying the video signal which includes both image data of the physical scene and graphics of the information updates.

16. A computing device according to claim 8, wherein the information source comprises one of: a social network service, an instant messaging service, a network application programming interface (API), a short messaging service (SMS) client or server, and wherein the process further comprises streaming subsequent updates from the information source to the computing device to overlay or replace the image of the face in the model of the virtual reality or in the video signal without recognizing the person according to the image of the face.

17. A computer-readable storage device according to claim 16, wherein the information source comprises a network resource, wherein the information items are received over a network from the network resource, wherein the network resource provides the information items based on the recognizing of the person, and wherein, each time an information item is received from the network resource, in response, the rendering is performed for the received information item.

18. A computer-readable storage device according to claim 16, the process further comprising performing image analysis on the video stream to detect a physical boundary, in the physical scene, of the physical picture of the person, wherein the arranging is based on the detected physical boundary.

19. A computer-readable storage device according to claim 18, the process further comprising conditioning performing of the face recognition on the detection of the physical boundary.

20. A computer-readable storage device according to claim 16, wherein the process further comprises performing face detection on the video stream to determine that a face is present from the picture of the person in the video stream.

* * * * *